March 20, 1951 M. F. A. JULIEN 2,545,956
SUSPENSION DEVICE FOR VEHICLES
Filed Feb. 28, 1945 4 Sheets-Sheet 1

INVENTOR
Maurice François Alexandre Julien
BY
*Lucke+Lucke*
AGENTS

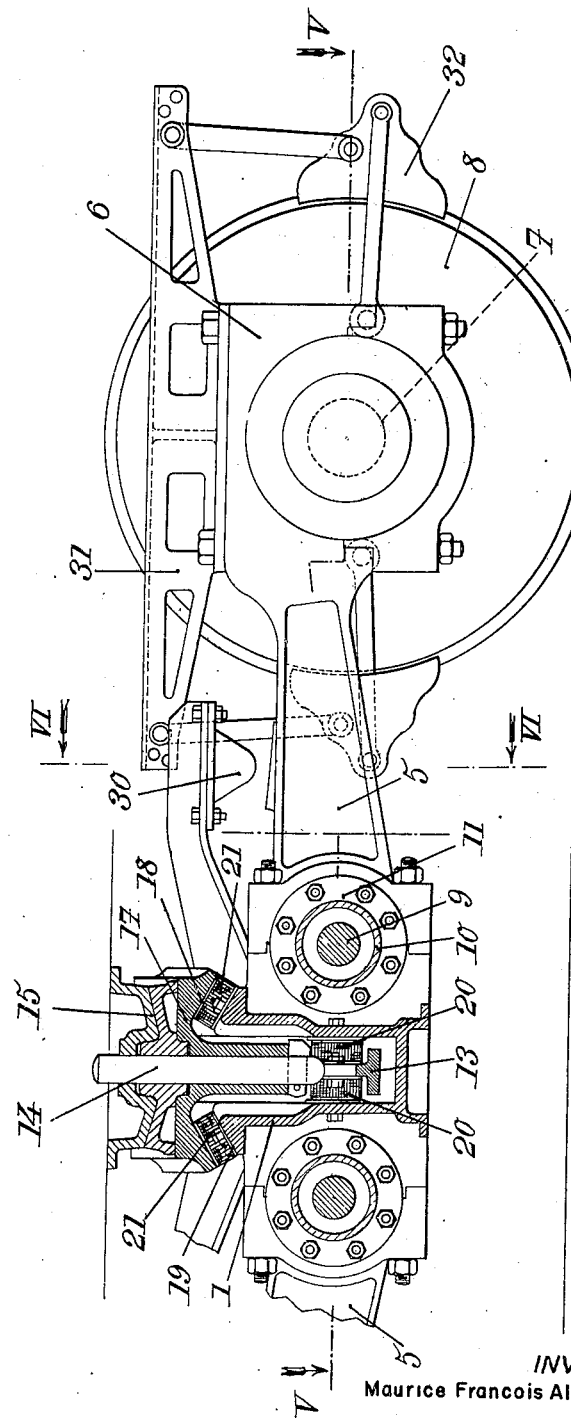

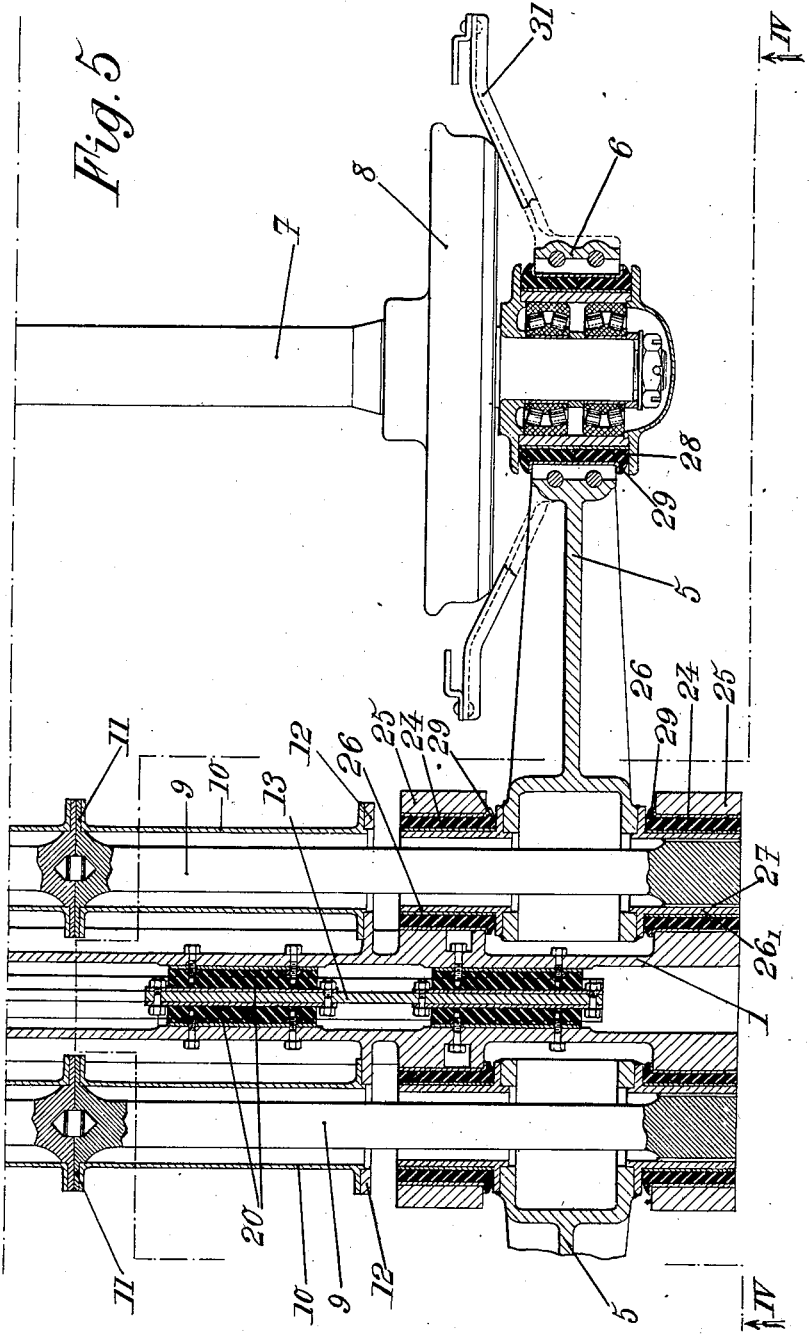

March 20, 1951     M. F. A. JULIEN     2,545,956
SUSPENSION DEVICE FOR VEHICLES
Filed Feb. 28, 1945     4 Sheets-Sheet 4
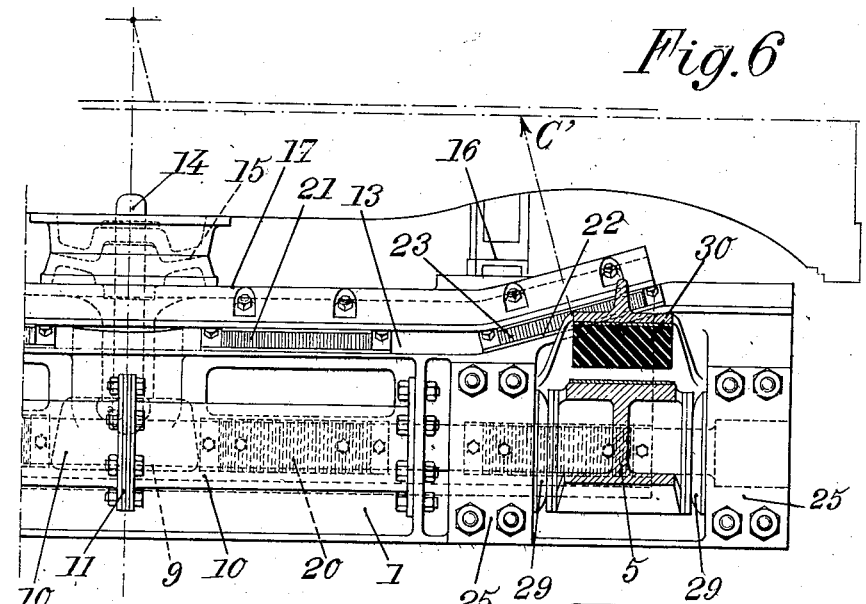
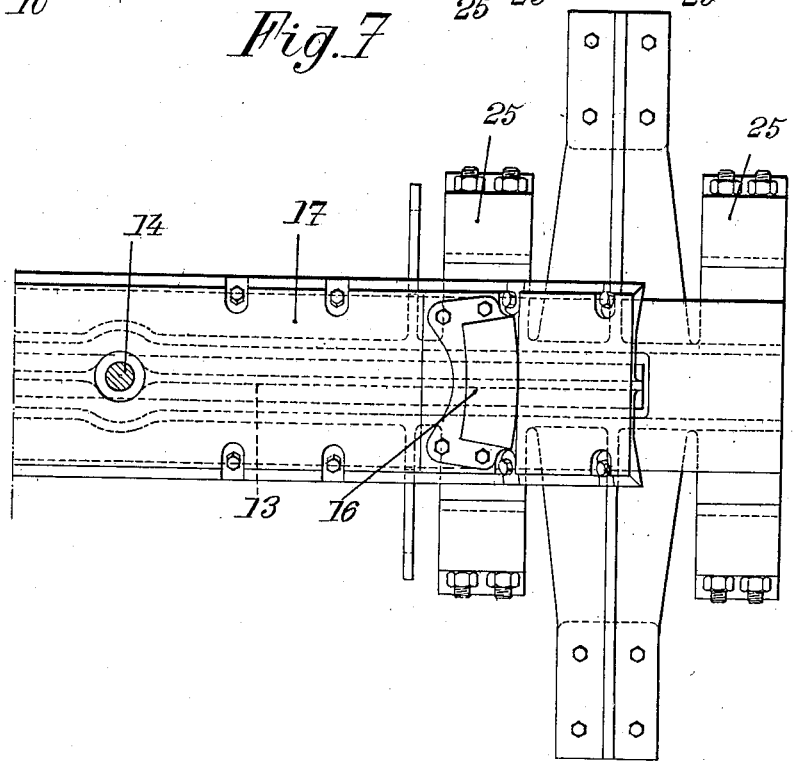
INVENTOR
Maurice Francois Alexandre Julien
*Lucke ⟂ Lucke*
AGENTS Patented Mar. 20, 1951

2,545,956

UNITED STATES PATENT OFFICE 2,545,956

SUSPENSION DEVICE FOR VEHICLES

Maurice François Alexandre Julien,
Toulouse, France

Application February 28, 1945, Serial No. 580,259
In France March 24, 1943

Section 1, Public Law 690, August 8, 1946
Patent expires March 24, 1963

1 Claim. (Cl. 105—182)

The invention relates to suspension devices for vehicles and more especially for vehicles provided with axle trucks, such as railway cars (although it is also applicable to automobile vehicles).

Its object is to render these devices more rational than those constructed heretofore and to improve the smoothness of their action.

Further features and objects of the invention will be more fully understood from the following detailed description and the accompanying drawings, in which—

Fig. 4 is an elevational view partly in section, and on an enlarged scale, of the invention taken on lines IV—IV of Fig. 5;

Fig. 5 is a top plan sectional view of the device taken on lines V—V of Fig. 4;

Fig. 6 is a sectional view of the suspension device taken on lines VI—VI of Fig. 4;

Fig. 7 is a plan view of part of the members more particularly shown in Fig. 6.

When applying the invention to a railway car truck, the said truck is constructed substantially as follows:

The truck essentially comprises at least one main cross member supporting the axles (two in number) in such a manner that these are mounted on two pairs of oscillating arms hinged respectively on the said main cross member about two parallel transverse axes, relatively close to each other (even coincident), in combination with resilient means opposing the action of gravity.

Figure 1:
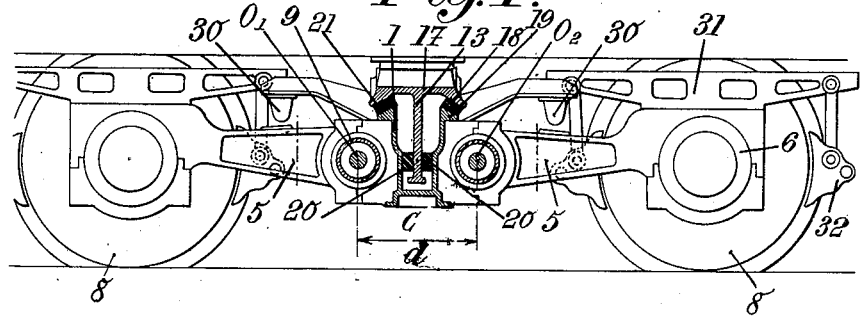
Fig. 1 is a side elevation, partly in section, taken on line I—I of Fig. 2, of a preferred embodiment of a suspension device showing a railcar truck pursuant to the invention.
Figure 2:
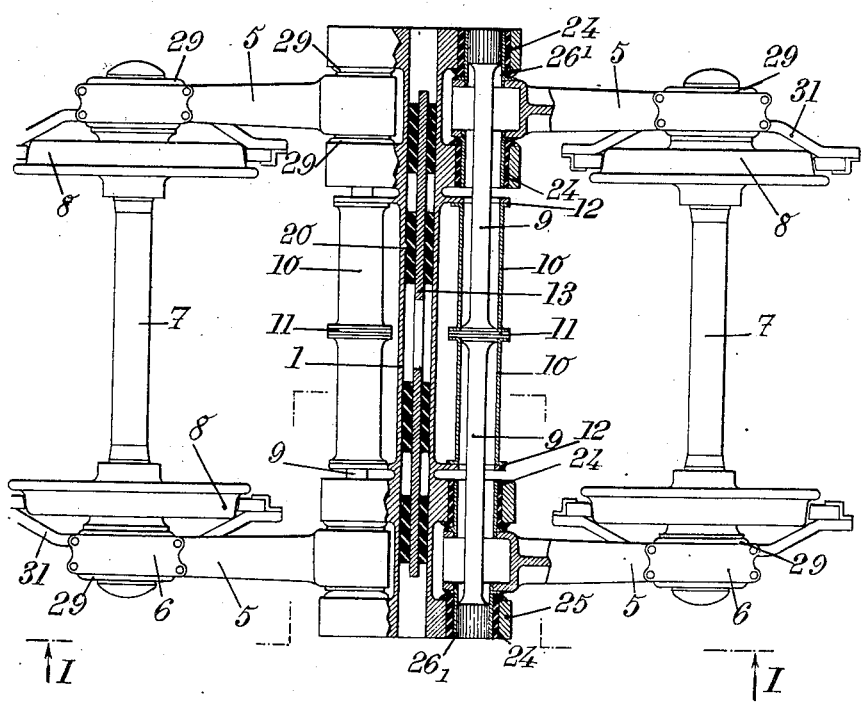
Fig. 2 is a top plan view of the device shown in Fig. 1.

To this end, the said main cross member I (Figs. 1 and 2) is arranged in any suitable manner, it being connected to the vehicle body, either directly or indirectly—in particular through the medium of an auxiliary cross member such as that hereinafter specified—said connection comprising in any case a substantially vertical pivot, as usual.

On this main cross member I are hinged, about axes such as $O_1$ and $O_2$, the two pairs of longitudinal arms 5, at the ends of which are mounted, through journal boxes 6 of known type, the axles 7 carrying the wheels 8, the distance $d$ between the axes $O_1$ and $O_2$ being fairly short, for example ⅕ the distance between the axles (or even less).

The aforesaid resilient means can be realized either in the form of helical or leaf springs or in the form of torsion bars, or in any other way.

In the case where torsion bars are provided, these are preferably arranged along the axes $O_1$ and $O_2$; moreover, another arrangement according to the invention is preferably resorted to, according to which two sets of members, each comprising at least one rod 9 and at least one co-axial tube 10, cooperate with one another respectively between the two oscillating arms of each axle, the two tubes being connected at their adjacent ends, for example by bolting or riveting them at 11, whilst their other ends are secured to the main cross member at 12, for example on flanges provided on the latter.

A suspension of this kind produces an antirolling effect, as will appear from the following considerations (it being understood that the invention would be applicable to all similar arrangements producing this result).

When the two arms of one and the same axle effect equal movements in the same direction, these movements result in subjecting to torsion both the rods 9 and the tubes 10, flexibility being therefore determined by these two elements considered as a whole. On the contrary, when the movements are equal and in the opposite direction, the rods 9 are alone subjected to torsion, thus resulting in a reduced flexibility. Finally, all combinations of movements of the said arms other than the preceding produce intermediary flexibilities. It is thus seen that an antirolling effect is effectively obtained since flexibility is at a maximum when the movements of the arms are equal.

Whatever be the embodiment adopted in regard to the resilient means per se, the arrangement of the two axes $O_1$ and $O_2$ relatively near to one another enables it to reduce to a minimum value the reaction stresses produced by the arms 5 on the cross member I when the wheels 8 are braked, such braking, as is well known, transmitting reaction couples to the said arms as a result of the supports for the braking members being secured to said arms (supports shown at 31 on the drawings and connected, for example, to the shoes 32 in the usual manner).

It is seen that the cross member I, when the brakes are applied, tends to oscillate about a fictitious axis C (Figs. 1 and 2) parallel to the two axes $O_1$ and $O_2$ and at equal distances therefrom; however, the couple is all the smaller as the distance $d$ is itself reduced.

Preferably, in accordance with another feature of the invention, means are provided for allowing the main cross member a certain latitude of movement with respect to the vehicle body—or, rather, in relation to another part (shown diagrammatically at 13 in Fig. 1) such as, for example, an auxiliary cross member embodied in the car trucks of known type—the said movement being preferably effected about the said fictitious axis C against a suitable resilient or damping action.

To this end, between the two aforesaid cross members 1 and 13 provision is for example made:

1. Either of a linked mechanical connection, of the ball and socket type or otherwise, in conjunction with separate resilient or damping means;

2. Or, in accordance with a form of embodiment hereinafter to be described, of a resilient or damping device which ensures, per se, the desired mobility between the said cross members.

According to a further feature of the invention, the connection between said cross members is such that the main cross member 1 can effect, relatively to the auxiliary cross member 13 or to the vehicle body, an oscillating movement about a longitudinal axis C' (Fig. 6) situated at a fairly considerable height, in particular at the level of the vehicle roof.

The arrangement just referred to is best realized by causing the main cross member 1 and the auxiliary cross member 13 to penetrate partially the one into the other and by providing in a suitable manner, rubber cushions between the opposite faces of these members, whereby the relative mobility of these members is ensured.

As shown in Figs. 4 to 7 by way of example, the auxiliary cross member 13, mounted on pivots 14—15, with the side bearing 16, has the general shape of a T with sides 17 exhibiting, in profile, inclined faces 18.

The main cross member 1 has a hollow section, for example in the shape of an U or an H, so that the web of the T of the auxiliary cross member can partially penetrate therein, the edges of the said main cross member likewise exhibiting inclined faces 19 to correspond with the inclined faces 18.

Between the web of the auxiliary cross member and the sides of the U of the main cross member and preferably opposite the fictitious axis C, resilient cushions 20 and 21 are inserted. Likewise, similar cushions are interposed between the oppositely situated faces 18 and 19, said faces being at right angles to planes passing through axis C or, again, being portions of surfaces of revolution about said axis.

Figure 3:
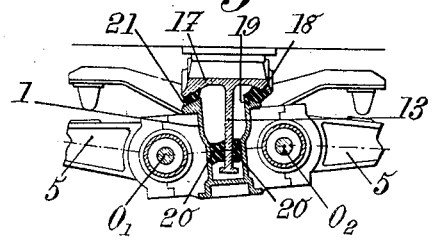
Fig. 3 is an elevational view of the embodiment shown in Fig. 1, in an exaggerated position, resulting from the application of the braking coupling to the wheels.

These cushions 20—21 are made to adhere to their respective surfaces so that when they are deformed under a shearing stress, a kind of resilient connection (about axis C) is obtained answering the desired purpose and absorbing the braking stresses or any other perturbing reactions. Fig. 3 shows (in an exaggerated manner, for the sake of clearness) one of the positions the cross member 1 may occupy under the effect of these reactions.

In order to produce a resilient connection of the same type about the axis C', the sides 17 of the auxiliary cross member exhibit, in elevation (Fig. 6), inclined faces 22 of such direction that the perpendiculars to every point of such faces converge towards the fictitious center C' (which lies outside said figure); similar faces are provided on the edges of the main cross member and resilient cushions 23 are interposed, as set forth above.

The foregoing arrangements are preferably supplemented by the following ones, which latter may, if desired, be used separately.

In accordance with one of these arrangements, the pivots for the suspension arms 5 are provided with resilient members or sleeves 24 made of rubber, held for example in bearings 25 integral with the main cross member 1.

The arms 5 are provided with hollow extensions 26—$26_1$, one of which exhibits, on its inside, groovings 27 for fixing the torsion bars. The sleeves 24 are interposed between the said extensions $26_1$ and the bearings 25.

In accordance with a similar arrangement, resilient sleeves 28 may be interposed between the journal boxes or grease boxes 6 and the corresponding bearings for the axles.

With regard to these sleeves 24—28 (or all other sleeves of the same kind), these are arranged preferably in such a manner that they allow resilient movements along their axes (thereby allowing the axles a certain liberty of motion transversely), said movements, however, being limited.

For this purpose, the said sleeves are, for example, extended on at least one side by means of surfaces 29 of mushroom shape; the resilient deformations are therefore produced mainly by way of axial shearing, but are limited by the crushing of the surfaces 29.

According to another feature of the invention, the main cross member is provided with resilient buffers such as 30 to limit the amplitude of the movements of the arms 5. Preferably, these buffers exhibit a conical or like profile in order to ensure progressivity of action.

In the foregoing description, mention has not been made of the various parts other than those relating to the suspension, said parts being constructed in any known manner.

As regards the brake levers, it appears preferable to provide the main cross member 1 at its base or in its center, with a pivot (not shown) which receives a bell crank lever for the control of said levers. In this manner, the control is not influenced by the rotation of the truck on curved track portions.

Finally, the suspension may comprise all special shock absorbing devices, such as hydraulic, pneumatic, dry friction devices, although the various resilient cushions referred to above contribute in themselves to shock absorption.

From the foregoing description, it will be apparent that a construction is obtained offering the following advantages in relation to those already in existence, viz: that of ensuring a rational suspension with an antirolling effect, that of offering great flexibility, in particular owing to the presence of resilient cushions, that of being noiseless, of being robust and of avoiding all undesirable braking reactions.

Whereas the invention has been described by reference to specific forms thereof, it will be understood that many changes and modifications may be made provided they do not depart from the scope of the claims.

I claim:

In a railway truck, a main transverse member of U-shaped section, a bolster of T-shaped section having its web engaged between the sides of said transverse member, rubber pads interposed between the bottom part of said web and said sides of the cross member, rubber pads interposed between the ends of the flanges of said bolster and the tops of said sides of the transverse member, the ends of said bolster and of said transverse member being correspondingly inclined upwardly and outwardly, and rubber pads inserted between these inclined portions of said bolster and said transverse member, respectively, all of said rubber pads being made adhesive to their adjoining bolster and transverse member surfaces.

MAURICE FRANÇOIS ALEXANDRE JULIEN.

REFERENCES CITED

The following references are of record in the file of this patent:

UNITED STATES PATENTS

| Number | Name | Date |
|---|---|---|
| 2,060,015 | Barnes et al. | Nov. 10, 1936 |
| 2,099,031 | Neal et al. | Nov. 16, 1937 |
| 2,103,590 | Le Fevre | Dec. 28, 1937 |
| 2,197,727 | Ledwinka | Apr. 16, 1940 |
| 2,231,195 | Piron | Feb. 11, 1941 |
| 2,251,950 | Piron | Aug. 12, 1941 |
| 2,264,702 | Latshaw | Dec. 2, 1941 |
| 2,286,608 | Eksergian | June 16, 1942 |
| 2,289,423 | Guernsey | July 14, 1942 |
| 2,320,086 | Ledwinka | May 25, 1943 |
| 2,402,501 | Ledwinka | June 18, 1946 |